United States Patent
Marks et al.

(10) Patent No.: US 8,562,894 B2
(45) Date of Patent: Oct. 22, 2013

(54) SYNTHETIC RESIN PROCESS AND ARTICLE USEFUL FOR PLATING APPLICATIONS

(75) Inventors: Matthew D. Marks, Waterford, MI (US); Andrew W. May, East Greenbush, NY (US)

(73) Assignee: Sabic Innovative Plastics IP B.V. (NL)

( * ) Notice: Subject to any disclaimer, the term of this patent is extended or adjusted under 35 U.S.C. 154(b) by 509 days.

(21) Appl. No.: 12/297,512

(22) PCT Filed: Sep. 10, 2008

(86) PCT No.: PCT/US2008/075890
§ 371 (c)(1),
(2), (4) Date: Jan. 21, 2009

(87) PCT Pub. No.: WO2009/036089
PCT Pub. Date: Mar. 19, 2009

(65) Prior Publication Data
US 2010/0174031 A1    Jul. 8, 2010

Related U.S. Application Data

(60) Provisional application No. 60/971,080, filed on Sep. 10, 2007, provisional application No. 60/971,295, filed on Sep. 11, 2007.

(51) Int. Cl.
*B29C 45/73* (2006.01)
*B29C 45/00* (2006.01)

(52) U.S. Cl.
USPC .................................................. 264/328.16

(58) Field of Classification Search
USPC .................................................. 264/328.16
See application file for complete search history.

(56) References Cited

U.S. PATENT DOCUMENTS

| | | | | |
|---|---|---|---|---|
| 4,340,551 A | * | 7/1982 | Wada et al. | 264/403 |
| 4,439,492 A | * | 3/1984 | Wada et al. | 428/409 |
| 5,371,132 A | * | 12/1994 | Ebara et al. | 524/413 |
| 5,376,317 A | * | 12/1994 | Maus et al. | 264/40.6 |
| 6,203,731 B1 | * | 3/2001 | Kato et al. | 264/40.6 |
| 6,290,882 B1 | | 9/2001 | Maus et al. | |

(Continued)

FOREIGN PATENT DOCUMENTS

| | | |
|---|---|---|
| EP | 0909626 A2 | 4/1999 |
| JP | 9314628 A | 12/1997 |
| JP | 2000225843 A | 8/2000 |
| JP | 2001225371 A | 8/2001 |

OTHER PUBLICATIONS

Japanese Patent No. 9314628; Publication Date: Dec. 9, 1997; Abstract Only; 1 page.

(Continued)

*Primary Examiner* — Satya Sastri
(74) *Attorney, Agent, or Firm* — Cantor Colburn LLP

(57) ABSTRACT

A method for processing reinforcing filler-filled synthetic resins and applications made therefrom wherein the resulting articles have the ability to be plated to form a structurally aesthetic product substantially free of visual defects. The process utilizes an accelerated heat and cool process to form a resin-rich surface that is substantially free of any reinforcing fillers, such as fiber strands and/or bundles, on the external surface of the article. As such, the resulting article is capable of being plated to form an article that is substantially free of visual defects caused by these fillers on the surface of the article.

21 Claims, 1 Drawing Sheet

(56) References Cited

U.S. PATENT DOCUMENTS

| | | | |
|---|---|---|---|
| 6,303,070 B1 | 10/2001 | Bulters et al. | |
| 7,323,127 B2 * | 1/2008 | Muranaka et al. | 264/40.6 |
| 2004/0188886 A1 * | 9/2004 | Yamashita et al. | 264/328.16 |

OTHER PUBLICATIONS

Japanese Patent No. 2001225371; Publication Date: Aug. 21, 2001; Abstract Only; 1 page.

International Search Report; International Application No. PCT/US2008/075890; International Filing Date: Sep. 10, 2008; Date of Mailing: Nov. 20, 2008; 7 pages.

Written Opinion of the International Searching Authority; International Application No. PCT/US2008/075890; International Filing Date: Sep. 10, 2008; Date of Mailing: Nov. 20, 2008; 7 pages.

\* cited by examiner

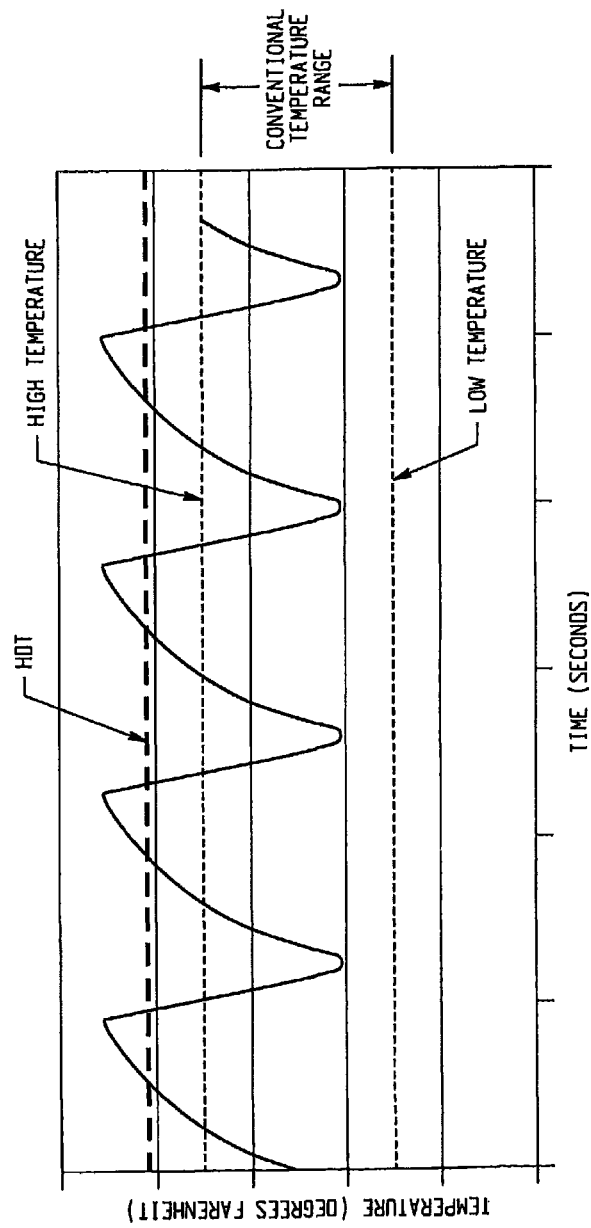

SYNTHETIC RESIN PROCESS AND ARTICLE USEFUL FOR PLATING APPLICATIONS

BACKGROUND OF INVENTION

Many companies are replacing metal parts with alternative materials that are lighter in weight but that are also capable of maintaining the structural benefits of metal. Due to the greater ease in processing plastic material into selected shapes, plastic materials have increased in popularity in terms of replacing metal parts. However, in many instances, plastic alone cannot match the strength properties of metals. As such, reinforced plastics or plastic composites have been utilized. Specifically, plastic composites include a reinforcing fiber in a polymer matrix. In many instances, the reinforcing fiber is glass fiber, although high-strength fibers such as aramid and carbon have been used in other applications.

The use of high glass loadings in thermoplastic materials tends to increase stiffness (tensile and flexural modulus) and strength (tensile & flexural strength) of the reinforced plastic. However, the use of highly glass filled materials has a negative effect on the surface quality and aesthetics of molded parts. After molding, the glass fibers on the exterior surface of the part produce a dull or matted finish and these fibers interfere with the adhesion of a subsequent painting or plating application that otherwise would cover the fibers.

Other types of filled or reinforced plastic materials suffer from similar problems. Traditional "high modulus" materials contain glass, or mica, or other fillers that are capable of increasing the modulus, or stiffness, of the material. Examples include glass filled PBT, PA, PC/ABS, PP, etc. However, the addition of fillers also has an adverse effect on the surface quality of the part. Therefore, these types of materials are molded in low gloss, textured applications. These parts can also be painted, but a primer is typically needed to cover the surface imperfections prior to the top-coat paint layer. As a result, "aesthetic" materials are typically unfilled, amorphous resins that can be easily molded-in-color, painted or metal plated. These materials include unfilled ASA, ABS, PC/ABS, PPO, etc. Again, however, these materials do not provide the structural strength necessary for many metal replacement applications.

Accordingly, it would be beneficial to provide a process for molding fiber-reinforced thermoplastic resins to produce an article having a resin-rich surface such that the presence of glass fibers and/or bundles on the external surface of the article are substantially eliminated. It would also be beneficial to provide a process for molding fiber-reinforced thermoplastic resins to produce an article capable of being plated. It would also be beneficial to provide an article molded from a fiber-reinforced thermoplastic resin wherein the resulting article were capable of being plated with a surface substantially free of visual defects.

SUMMARY OF THE INVENTION

The present invention provides a method for processing reinforcing filler-filled synthetic resins and applications made therefrom wherein the resulting articles have the ability to be plated to form a structurally aesthetic product that is substantially free of visual defects. The process utilizes an accelerated heat and cool process to form a resin-rich surface that is substantially free of any reinforcing fillers, such as fiber strands and/or bundles, on the external surface of the article. As such, the resulting article is capable of being plated to form an article that is substantially free of visual defects caused by these fillers on the surface of the article. The molded, article is beneficially applicable in structural aesthetic applications wherein the surface quality of the molded article is important.

Accordingly, in one aspect, the present invention provides a process for molding an article including the steps of injecting a thermoplastic resin having a reinforcing filler into a mold having at least one channel for receiving a temperature control fluid; supplying a heated temperature control fluid to rapidly heat the thermoplastic resin to a temperature above the heat deformation temperature of the thermoplastic resin; molding the thermoplastic resin to form a molded article; and supplying a cooled temperature control fluid to the mold to rapidly cool the molded article; wherein the molded article is capable of being plated such that at least a portion of surface of the molded article is substantially free of any reinforcing fillers.

In another embodiment, a process for molding an article comprises: injecting a thermoplastic resin having a reinforcing filler into a mold such that the thermoplastic resin contacts a mold surface, molding the thermoplastic resin to form a molded article; and supplying a cooled temperature control fluid to the mold to cool the molded article. The reinforcing filler is present in an amount of about 5 wt % to about 70 wt %, based upon a total weight of the thermoplastic resin with the reinforcing filler. The mold surface has a temperature greater than a heat deformation temperature of the thermoplastic, wherein the mold has at least one channel for receiving a temperature control fluid. The molded article has a gloss rating of greater than or equal to 40, as measured with a 60° gloss meter.

In another aspect, the present invention provides a thermoplastic resin including a reinforcement filler, wherein the molded article is capable of being plated such that at least a portion of surface of the molded article is substantially free of individual fillers or bundles of fillers.

BRIEF DESCRIPTION OF THE DRAWINGS

The various embodiments of the present invention can be understood with reference to the following drawings. The components are not necessarily to scale. Also, in the drawings, like reference numerals designate corresponding parts throughout the several views.

FIG. 1 is a graph showing the temperatures of conventional molding technologies as compared to the molding temperatures of the processes of the present invention.

DETAILED DESCRIPTION OF THE INVENTION

The present invention is more particularly described in the following description and examples that are intended to be illustrative only since numerous modifications and variations therein will be apparent to those skilled in the art. As used in the specification and in the claims, the term "comprising" may include the embodiments "consisting of" and "consisting essentially of." All ranges disclosed herein are inclusive of the endpoints and are independently combinable. The endpoints of the ranges and any values disclosed herein are not limited to the precise range or value; they are sufficiently imprecise to include values approximating these ranges and/ or values. Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments (such as the multiple dependencies of the claims set forth herein) and are not limited to the specific combination in which they are discussed.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value.

It is known that when molding a material for an aesthetic application, like a metal-plated or high gloss part, that increasing tool temperature improves the surface quality of the part. In general, by operating at a slightly higher molding temperature, a more resin-rich surface (i.e. substantially free of impurities) helps to reduce molded in stress, provides a resin rich surface, and allows improved tool surface replication. However, simply operating at a slightly increased temperature does not provide a resin-rich surface when the thermoplastic resin includes a filler, such as a fiber filler. Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments and are not limited to the specific combination in which they are discussed.

Conversely, when a thermoplastic resin is molded by an injection molding or compression molding, in order to avoid elongation of time in a molding cycle due to change in temperature of the mold, molding is carried out at a marginal temperature range which barely permits the melt to be filled into the mold and the product taken out from the mold without deformation. As such, the higher temperatures needed to help provide a resin-rich surface end up resulting in a longer molding time, thereby increasing the overall cycle time and reducing the productivity.

Accordingly, the present invention utilizes a heat and cool technology whereby the molding process is operated at a higher molding temperature, and one higher than normally utilized for filled resins, but that offers reduced cycle times. This is accomplished by utilizing a heated temperature control fluid to rapidly (e.g., heat at a rate of 0.1 to 500° C. per minute) heat the mold followed by the use of a cooled temperature fluid control fluid to rapidly cool the molded part. As a result, cycle times are reduced while permitting a resin-rich surface to be formed that is substantially free of fillers, such as fibers or fiber bundles, on at least a portion of the exterior surface of the molded part. Since the presence of impurities on the surface of a part, such as fibers and fiber bundles, interfere with subsequent plating processes, the molded articles made by the present invention are also capable of being plated (e.g., chrome plated). As used herein, "capable of being plated" refers to a molded part that is substantially free of any fillers on the portion of the surface to be plated. A molded part that is capable of being plated is one that is substantially free of any visual defects on the plated portion of the molded part. Visual defects include voids and blisters.

In addition, when a thermoplastic resin is subjected to injection molding, if the temperature of the mold is kept at a high temperature upon filling the melt into the mold, since the fluidity of the resin is improved, it becomes possible to take an advantage in forming the product into a thin-walled product as well as in improving replication property, i.e., how well the shape of the cavity surface is replicated to the surface of the product. In addition, a weld line becomes not conspicuous. As such, the concepts of the present invention can also be utilized to form thin-walled parts capable of being plated.

Accordingly, the present invention provides a method for processing reinforcing filler-filled synthetic resins and applications made therefrom wherein the resulting articles have the ability to be plated to form a structurally aesthetic product that is substantially free of visual defects. The process utilizes an accelerated heat and cool process to form a resin-rich surface that is substantially free of any reinforcing fillers, such as fiber strands and/or bundles, on the portion of the external surface of the article to be plated. As such, the resulting article is capable of being plated to form an article that is substantially free of visual defects, such as voids and blisters, caused by these fillers on the surface of the article. The molded article is beneficially applicable in structural aesthetic applications wherein the surface quality of the molded article is important.

The present invention utilizes a heat and cool process technology to help provide a resin-rich surface while also providing lower cycle times. In this process; the injection mold (tool) is heated with a heated temperature control fluid, such as pressurized water, such that the mold temperature is heated to a temperature well above traditional injection molding temperatures (and above the HDT of the material). After molding, the tool is subsequently cooled to provide a resin rich surface on the molded part.

Accordingly, in a first aspect, the present invention provides a method of processing a synthetic resin to form a molded article capable of being plated. Accordingly, the molded article is constructed from a thermoplastic resin capable of being injected molded. In one embodiment, the thermoplastic resin may be selected from a wide variety of thermoplastic resins, blend of thermoplastic resins, thermosetting resins, or blends of thermoplastic resins with thermosetting resins. The thermoplastic resin may also be a blend of polymers, copolymers, terpolymers, or combinations including at least one of the foregoing thermoplastic resins. Examples of the thermoplastic resin include, but are not limited to, polyacetals, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, or the like, or a combination including at least one of the foregoing thermoplastic resins.

Specific non-limiting examples of blends of thermoplastic resins include acrylonitrile-butadiene-styrene/nylon, polycarbonate/acrylonitrile-butadiene-styrene, polyphenylene ether/polystyrene, polyphenylene ether/polyamide, polycarbonate/polyester, polyphenylene ether/polyolefin, and combinations including at least one of the foregoing blends of thermoplastic resins.

Examples of thermosetting resins include polyurethane, natural rubber, synthetic rubber, epoxy, phenolic, polyesters, polyamides, silicones, and mixtures including any one of the foregoing thermosetting resins. Blends of thermoset resins as well as blends of thermoplastic resins with thermosets can be utilized.

Exemplary examples of the thermoplastics resin include organic polymers that are flexible at temperatures of about 200° C. to about −60° C. Examples of beneficial thermoplastic resins that may be used in the present invention include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, glass filled blends of polyphenylene oxide and polystyrene, blends of polyphenylene ether/polyamide, blends of polycarbonate/PET/PBT, polybutylene terephthalate and impact modifier, polyamides, phenylene sulfide resins, polyvinyl chloride PVC, high impact polystyrene (HIPS), low/high density polyethylene, polypropylene and thermoplastic olefins (TPO), polyethylene and fiber composites, and polypropylene and fiber composites.

In addition to the thermoplastic resin, the reinforcing filler-filled thermoplastic materials used in the present invention include a plurality of reinforcing fillers, such as fibers fillers. The concepts of the present invention can be utilized with a variety of fiber-filled thermoplastic materials, depending on the selected characteristics of the fiber-filled thermoplastic material and any article molded from the fiber-filled thermoplastic material. For example, in one embodiment, the fiber is a glass fiber used for reinforcement. In an alternative embodiment, the fiber-filled thermoplastic material includes carbon fibers to impart improved conductivity to the fiber-filled thermoplastic materials and any article made therefrom. In another embodiment, the fiber-filled thermoplastic material may include aramid fibers. Other fibers that may be used include metal fibers, metal-coated fibers, organic fibers, ceramic fibers, biocompatible fibers or any other fiber capable of withstanding the process to impart the selected characteristic to the molded article. In alternative embodiments, non-fiber fillers may be used for the reinforcing fillers, such as glass beads, glass flakes, talc, clay or any other reinforcement filler.

In use, the processes of the present invention utilize heat and cool process technology to heat the tool above the heat distortion temperature (HDT) of the thermoplastic resin. The fiber-filled resin is then injected to the mold to form the molded part. Then, cooling the mold tool cools the molded part. After the parts have solidified, they are ejected from the tool cavity. The heating and cooling processes are controlled using a temperature control fluid. For heating, a heated temperature control fluid is used. For cooling, a cooled temperature control fluid is utilized. In one embodiment, the temperature control fluid is pressurized water, with the temperature of the water being adjusted such that it helps to rapidly heat or cool the mold. In another embodiment, the temperature control fluid is unpressurized water, with the temperature of the water being adjusted such that it helps to rapidly heat or cool the mold. In other alternative embodiments, other temperature control fluids may be used including, but not limited to, steam, oil, or any other non-Freon based temperature control fluid may be used. In the various embodiments, the reinforcing filler can be present in the reinforcing filler-filled thermoplastic material in an amount of less than or equal to about 70 weight percent (wt %), specifically, about 1 wt % to about 70 wt %, more specifically, about 5 wt % to about 40 wt %, even more specifically, about 10 wt % to about 30 wt %, wherein the weight is based upon a total weight of the reinforcing filler-filled thermoplastic material.

As may be seen in FIG. 1, the processes of the present invention operate on a much higher molding temperature as compared to prior art processes. In the prior art, the molding temperature is typically less than the HDT of the thermoplastic resin. Conversely, the methods of the present invention heat to a temperature above the heat deformation temperature (HDT) of the thermoplastic resin being molded, e.g., greater than 1° C. above the HDT, specifically, 1 to 100° C. above the HDT, more specifically, 15 to 100° C. above the HDT, even more specifically, 30 to 100° C. above the HDT, and yet more specifically, 60 to 100° C. above the HDT.

As a temperature control fluid is used, the mold itself is designed to be capable of using a temperature control fluid. In one embodiment, the mold tool includes one or more channels through which both the heated temperature control fluid and the cooled temperature control fluid are passed. In an alternative embodiment, the mold tool includes separate channels, one for the temperature control fluid and one for the cooled temperature control fluid. The channels used in the mold tool can be, in one embodiment, traditional (straight) lines, or they can be, in an alternative embodiment, conformal (i.e. conforming to the shape of the part), or they can be flood cooling (where large areas of tool steal are removed for the water to flow through).

As mentioned above, in alternative embodiments, several different types of cooling lines can be used. In one beneficial embodiment, conformal cooling is utilized since it permits the rapid heat transfer from the metal used to form the mold tool to the temperature control fluid lines.

As discussed, the processes of the present invention help form molded parts that are capable of being plated. As discussed, "capable of being plated" refers to a molded part that is substantially free of any fibers or fiber bundles on the portion of the surface of the molded part to be plated. As such, the molded parts of the present invention can be plated such that the resulting plated part is substantially free of any visual defects, such as voids and blisters, in the plated portion of the part. The molded parts capable of being plated may be plated using any known plating technology capable of applying a metal or metal-containing coating to a plastic part. Examples of metals that can be plated include, but are not limited to, cadmium, copper, electrolytic and electroless nickel, gold, silver, tin, zinc plating, or a combination including at least one of the foregoing metals. Examples of plating processes that can be used include, but are not limited to, electrolytic plating, electroless plating, anodized plating, physical vapor deposition (PVD) plating, or a combination including at least one of the foregoing plating processes.

The concepts of the present invention can be used to form a variety of structurally aesthetic parts including, but not limited to, TV bezels, instrument panel center bezels, automotive parts, such as roof racks, and the like.

The following examples serve to illustrate the invention but are not intended to limit the scope of the invention.

EXAMPLES

In these examples, a polycarbonate/acrylonitrile butadiene styrene (PC/ABS) resin having 20% glass fiber was molded in an injection molding high polish tool having a SPI A2 tool surface. The fiber-filled PC/ABS was molded using a conventional molding process (the mold temperature was not above the HDT of the PC/ABS) and was then molded in a process according to the concepts of the present invention wherein the temperature of the mold was heated to a temperature above the HDT of the PC/ABS using pressurized heated water. The mold was cooled also using water as the cooled temperature control fluid. Gloss measurements were then taken using a 60° gloss meter, and the results recorded in Table 1.

TABLE 1

60° Gloss readings on PC/ABS resin molded in a high polish tool (SPI A2 Tool Surface)

| Sample | Conventional SPI B2 Tool Surface | Conventional SPI A2 Tool Surface | Heat and Cool SPI B2 Tool Surface | Heat and Cool SPI A2 Tool Surface |
|---|---|---|---|---|
| 1 | 6.8 | 21.7 | 3.8 | 90.6 |
| 2 | 6.3 | 20.8 | 3.4 | 91.7 |
| 3 | 4.2 | 11.5 | 4.0 | 90.3 |
| 4 | 10.6 | 16.0 | 3.5 | 88.1 |
| 5 | 5.3 | 17.4 | 3.3 | 91.1 |
| Average | 6.6 | 17.5 | 3.6 | 90.4 |

A2 is a highly polished surface. B2 is a dull, or matte, finish. Heat and Cool replicates the tool surface very well as can be seen in the matte finish replication, whereas the parts made using the polished surface had a much higher gloss rating, thereby showing the resin-rich surface as well as the substantial reduction of glass fibers and/or glass bundles on the exterior surface of the molded parts in either matte or polished parts. The reinforcing filler-filled articles had a gloss rating of greater than or equal to 40, specifically, greater than or equal to 60, more specifically, greater than or equal to 80, and even more specifically, greater than or equal to 90. As a result, the molded parts made according to the concepts of the present invention are capable of being subsequently plated.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A process for molding an article comprising:
injecting a thermoplastic resin having a reinforcing filler into a mold to contact a mold surface, wherein the mold has a channel for receiving a temperature control fluid;
supplying a heated temperature control fluid to heat the mold surface to a temperature from 1 to 100° C. above the heat deformation temperature of the thermoplastic resin at a rate greater than 120° C. per minute and less than or equal to 500° C. per minute;
molding the thermoplastic resin to form a molded article; and
supplying a cooled temperature control fluid to the mold to cool the molded article;
wherein the molded article is capable of being plated such that at least a portion of the surface of the molded article is substantially free of any reinforcing fillers.

2. The process of claim 1, wherein the thermoplastic resin is selected from polyacetals, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, or a combination including at least one of the foregoing thermoplastic resins.

3. The process of claim 1, wherein the thermoplastic resin having a reinforcing filler is selected from acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, glass filled blends of polyphenylene oxide and polystyrene, blends of polyphenylene ether/polyamide, blends of polycarbonate/PET/PBT, polybutylene terephthalate and impact modifier, polyamides, phenylene sulfide resins, polyvinyl chloride PVC, high impact polystyrene (HIPS), low/high density polyethylene, polypropylene and thermoplastic olefins (TPO), polyethylene and fiber composites, polypropylene and fiber composites, or a combination thereof.

4. The process of claim 1, wherein the reinforcing filler is a fiber and the fiber is selected from glass fiber, ceramic fiber, carbon fiber, aramid fiber, or a combination including at least one of the foregoing fibers.

5. The process of claim 1, wherein the heated temperature control fluid comprises pressurized water.

6. The process of claim 1, wherein the cooled temperature control fluid comprises pressurized water.

7. A process for molding an article comprising:
injecting a thermoplastic resin having a reinforcing filler into a mold such that the thermoplastic resin contacts a mold surface, wherein the reinforcing filler is present in an amount of about 5 wt % to about 70 wt %, based upon a total weight of the thermoplastic resin with the reinforcing filler, and wherein the mold surface has a temperature greater than a heat deformation temperature of the thermoplastic and wherein the mold is heated at a rate greater than 120° C. per minute and less than or equal to 500° C. per minute, wherein the mold has a channel for receiving a temperature control fluid;
molding the thermoplastic resin to form a molded article; and
supplying a cooled temperature control fluid to the mold to cool the molded article;
wherein the molded article has a gloss rating of greater than or equal to 40, as measured with a 60° gloss meter.

8. The process of claim 1, wherein conformal cooling is used to supply a cooled temperature control fluid to the mold to cool the molded article.

9. The process of claim 1, wherein the reinforcing filler is present in an amount of about 10 wt % to about 30 wt %, based upon a total weight of the thermoplastic resin with the reinforcing filler.

10. The process of claim 9, wherein the reinforcing filler comprises glass fiber.

11. The process of claim 1, wherein the thermoplastic resin comprises a polycarbonate/ABS blend.

12. The process of claim 1, wherein the heated temperature control fluid heats the mold surface to a temperature from 30 to 100° C. above the heat deformation temperature of the thermoplastic resin.

13. The process of claim 1, further comprising chrome plating the molded article.

14. The process of claim 7, wherein conformal cooling is used to supply a cooled temperature control fluid to the mold to cool the molded article.

15. The process of claim 7, wherein the reinforcing filler is present in a mount of about 10 wt % to about 30 wt %.

16. The process of claim 15, wherein the reinforcing filler comprises glass fiber.

17. The process of claim 7, wherein the thermoplastic resin comprises a polycarbonate/ABS blend.

18. The process of claim 7, wherein the mold surface has a temperature 60 to 100° C. above the heat deformation temperature of the thermoplastic resin.

19. The process of claim 7, further comprising chrome plating the molded article.

20. A process for molding an article, comprising:
injecting a thermoplastic resin having a reinforcing filler into a mold to contact a mold surface, wherein the mold has a channel for receiving a temperature control fluid;
supplying a heated temperature control fluid to heat the mold surface to a temperature from 1 to 100° C. above the heat deformation temperature of the thermoplastic resin;
molding the thermoplastic resin to form a molded article; and
supplying a cooled temperature control fluid to the mold to cool the molded article; and
plating the molded article.

21. The process of claim 20, wherein the plating comprising chrome plating.

* * * * *